United States Patent
Magaki et al.

(10) Patent No.: US 9,003,261 B2
(45) Date of Patent: Apr. 7, 2015

(54) MEMORY SYSTEM

(71) Applicant: Kabushiki Kaisha Toshiba, Tokyo (JP)

(72) Inventors: Ikuo Magaki, Kanagawa (JP); Naoto Oshiyama, Tokyo (JP); Kenichiro Yoshii, Tokyo (JP); Kosuke Hatsuda, Tokyo (JP); Shirou Fujita, Kanagawa (JP); Tokumasa Hara, Kanagawa (JP); Kohei Oikawa, Kanagawa (JP); Kenta Yasufuku, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 31 days.

(21) Appl. No.: 14/017,246

(22) Filed: Sep. 3, 2013

(65) Prior Publication Data
US 2014/0129901 A1 May 8, 2014

(30) Foreign Application Priority Data

Nov. 5, 2012 (JP) .................. 2012-243630

(51) Int. Cl.
*G11C 29/00* (2006.01)
*G06F 11/10* (2006.01)

(52) U.S. Cl.
CPC .................. *G06F 11/1008* (2013.01)

(58) Field of Classification Search
CPC ............ G06F 11/1004; G06F 11/1008; G06F 11/1049
USPC .................. 714/755, 763, 746, 766, 764, 773
See application file for complete search history.

(56) References Cited

U.S. PATENT DOCUMENTS

| 8,112,689 | B2* | 2/2012 | Hong et al. | 714/755 |
| 8,418,028 | B2* | 4/2013 | Yamaga | 714/763 |
| 8,788,905 | B2* | 7/2014 | Lee et al. | 714/763 |
| 2006/0274566 | A1 | 12/2006 | Takashima et al. | |
| 2008/0163023 | A1 | 7/2008 | Hong et al. | |
| 2010/0162080 | A1 | 6/2010 | Kinoshita | |
| 2010/0218064 | A1* | 8/2010 | Ito | 714/746 |
| 2012/0192035 | A1* | 7/2012 | Nakanishi | 714/766 |
| 2014/0040695 | A1* | 2/2014 | Iwasaki | 714/755 |

FOREIGN PATENT DOCUMENTS

| JP | 2006-338370 A | 12/2006 |
| JP | 2008-165805 A | 7/2008 |
| JP | 2010-146389 A | 7/2010 |

* cited by examiner

Primary Examiner — David Ton
(74) Attorney, Agent, or Firm — Patterson & Sheridan, LLP (57) ABSTRACT

A memory system includes a first nonvolatile memory, a second nonvolatile memory with a longer access latency than the first nonvolatile memory, a first error correction unit, a second error correction unit, and an interface. The first nonvolatile memory stores first data and a first error correction code generated for the first data. The second nonvolatile memory stores a second error correction code which is generated for the first data with a higher correction ability than that of the first error correction code. The first error correction unit performs error correction on the first data by using the first error correction code. The second error correction unit performs error correction on the first data by using the second error correction code. The interface transmits the first data after the error correction to a host.

20 Claims, 8 Drawing Sheets

MEMORY SYSTEM

CROSS-REFERENCE TO RELATED APPLICATION

This application is based upon and claims the benefit of priority from Japanese Patent Application No. 2012-243630, filed Nov. 5, 2012, the entire contents of which are incorporated herein by reference.

FIELD

Embodiments described herein relate to a memory system.

BACKGROUND

In recent years, various Solid State Drives (SSDs) have been developed as memory drives which are installed in computer systems. The SSDs include nonvolatile flash memories mounted thereon and have characteristics that the SSDs operate at a higher speed and are lower in weight as compared to hard disks.

Since the number of times the nonvolatile flash memories, especially NAND type flash memories, can be rewritten is limited, it is necessary to avoid frequent data access to specific regions. Therefore, reliability of the memory drives is secured by mounting volatile random access memories such as a Dynamic Random Access Memory (DRAM) on the memory drives and suppressing access to the nonvolatile flash memories. In addition, there is also a case where access performance of a memory drive is enhanced by placing user data and system data, which are frequently accessed, in a DRAM with shorter access latency than that of the NAND type flash memory. There is also a possibility that a Magnetoresistive Random Access Memory (MRAM) or an Ferroelectric Random Access Memory (FeRAM) is used instead of the DRAM.

In addition, there is a configuration in which an error correcting code (hereinafter, referred to as ECC data) is applied to data when data is written in the NAND type flash memory or the nonvolatile memory, and error detection and correction for the data is performed based on the ECC data when the data is read in order to enhance reliability of an SSD.

However, the MRAM, the FeRAM, and other future nonvolatile memory are likely to have lower reliability of data for a while after their mass production has started. Therefore, there is a high possibility that data cannot be corrected only using the ECC data stored in non-volatile memory.

DETAILED DESCRIPTION

Embodiments provide a memory system with enhanced error correction ability.

A memory system according to an embodiment includes a first nonvolatile memory, a second nonvolatile memory with a longer access latency than that of the first nonvolatile memory, a first error correction unit, a second error correction unit, and an interface. The first nonvolatile memory stores first data and a first error correction code generated for the first data therein. The second nonvolatile memory stores a second error correction code with a higher error correction ability than that of the first error correction code, which is generated for the first data. The first error correction unit performs error correction on the first data by using the first error correction code. The second error correction unit performs error correction on the first data by using the second error correction code. The interface transmits the first data after the error correction to the host.

Hereinafter, exemplary embodiments will be described with reference to the drawings.

First Embodiment

Figure 1:
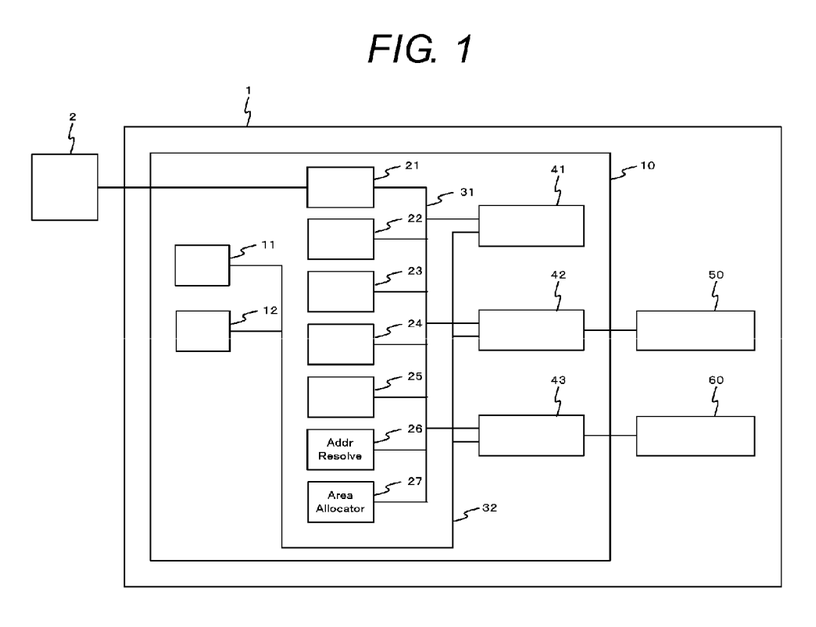
FIG. 1 is a block diagram showing a configuration of a memory system according to a first embodiment.

FIG. 1 is a block diagram showing a configuration of a memory system 1 according to a first embodiment. The memory system 1 according to the first embodiment includes a first nonvolatile memory 50, a second nonvolatile memory 60, and a memory controller 10 which controls the first nonvolatile memory 50 and the second nonvolatile memory 60. Although an FeRAM or an MRAM with a short access latency is used as the first nonvolatile memory 50, any nonvolatile memory, e.g., ones which will be available in the future, maybe used. The second nonvolatile memory 60 is a memory with higher reliability than that of the first nonvolatile memory 50, and an NAND type flash memory is used, for example.

The memory system 1 is connected to a host 2 of a computer or the like via a host I/F 21 and functions as an external memory of the host 2.

The memory controller 10 includes a CPU 11, a ROM 12, a host I/F 21, an ECC1 encoder 22, an ECC1 decoder 23, an ECC2 encoder 24, an ECC2 decoder 25, an AddrResolve 26, an AreaAllocator 27, an SRAM 41, a first nonvolatile memory controller 42, and a second nonvolatile memory controller 43.

The host I/F 21, the ECC1 encoder 22, the ECC1 decoder 23, the ECC2 encoder 24, the ECC2 decoder 25, the AddrResolve 26, the AreaAllocator 27, the SRAM 41, the first nonvolatile memory controller 42, and the second nonvolatile memory controller 43 are connected to each other via a data bus 31.

The CPU 11, the ROM 12, the SRAM 41, the first nonvolatile memory controller 42, and the second nonvolatile memory controller 43 are connected to each other via a control bus 32.

The CPU 11 controls the operations of the entire memory system 1. The CPU 11 reads firmware (control program)

which is stored in the ROM 12 into the SRAM 41 and executes predetermined processing when the memory system 1 receives power supply.

The ROM 12 stores a control program and the like which are controlled by the CPU 11. The SRAM 41 is used as a work area of the CPU 11 and stores the control program and various tables which are loaded from the ROM 12.

The first nonvolatile memory controller 42 controls processing such as reading data from and writing data in the first nonvolatile memory 50 which is connected to the outside of the memory controller.

The second nonvolatile memory controller 43 controls processing such as reading data from, writing data in, and erasing data from the second nonvolatile memory 60 which is connected to the outside of the memory controller.

The AddrResolve 26 converts logical data addresses (hereinafter, referred to as LBAs) which are notified from the host 2 into physical addresses of the first nonvolatile memory 50 and the second nonvolatile memory 60 and solves which address of which nonvolatile memory should be accessed in order to process a request from the host 2.

The AreaAllocator 27 performs allocation of data writing destinations in writing data in the first nonvolatile memory 50 and the second nonvolatile memory 60.

The ECC1 encoder 22 generates an error correction code (hereinafter, referred to as ECC1 data) for data which is stored in the first nonvolatile memory 50 and writes the ECC1 data in the first nonvolatile memory 50 via the first nonvolatile memory controller 42. The ECC1 data is generated in units of small data units. The small data units mean sector units which are minimum access units designated in the LBA from the host 2, for example. The size of the sector is 512 bytes, for example.

The ECC1 decoder 23 performs error detection and error correction for the data, which is read from the first nonvolatile memory 50, based on the ECC1 data.

The ECC2 encoder 24 generates an error correction code (hereinafter, referred to as ECC2 data) for the data which is stored in the first nonvolatile memory 50 and writes the ECC2 data in the second nonvolatile memory 60 via the second nonvolatile memory controller 43. The ECC2 data is generated in units of a plurality of data items which are obtained by adding the ECC1 data to the data in units of the small data units. A specific data unit will be described later.

The ECC2 decoder 25 performs error detection and error correction for the data which is read from the first nonvolatile memory 50 based on the ECC2 data.

Figure 2:
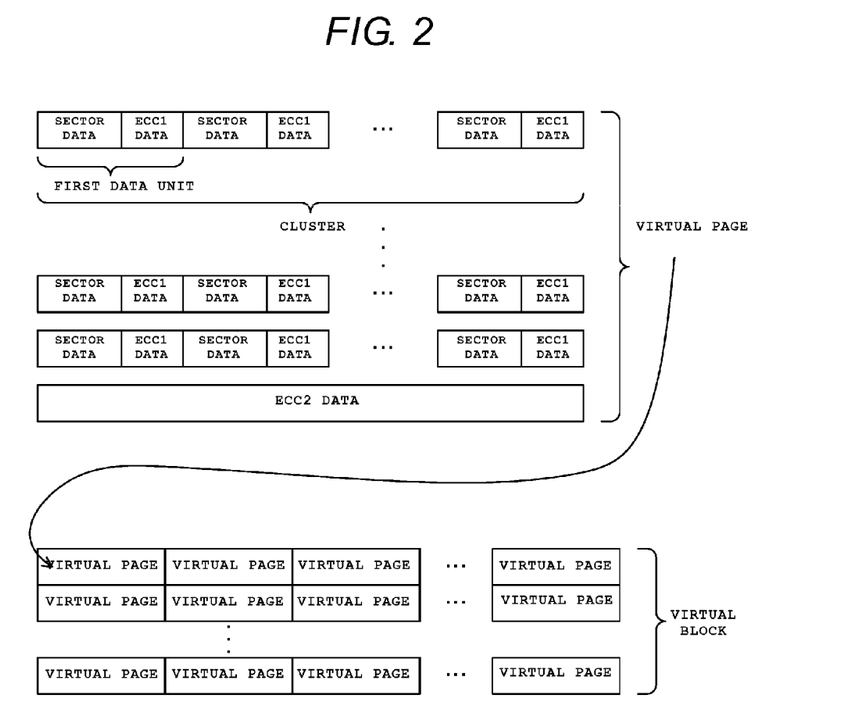
FIG. 2 is a diagram showing a data unit which is used in the memory system according to the first embodiment.

FIG. 2 is a diagram which is used in the memory system 1. The data in small units which are designated in the LBA from the host 2 is assumed to be sector data, and the unit of data which is obtained by adding the ECC1 data to the sector data is assumed to be a first data unit. An address for specifying a sector is referred to as a sector address. The sector address coincides with the LBA. A cluster organizes a plurality of sector data items whose sector addresses are consecutive and ECC1 data which is created for the respective sector data, and is usually configured by data in first data units, the number of which is a power of two. An address for specifying a cluster is referred to as a cluster address (hereinafter, referred to as an LCA) and is expressed by dividing the sector address by a sector number which is included in the cluster. A plurality of pages are collectively referred to as a virtual page. In addition, the virtual page is configured of data which is obtained by organizing a plurality of clusters and the ECC2 data which is calculated based on the data. A plurality of virtual pages are collectively referred to as a virtual block, and an address for specifying a virtual block is referred to as a virtual block address.

Figure 3:
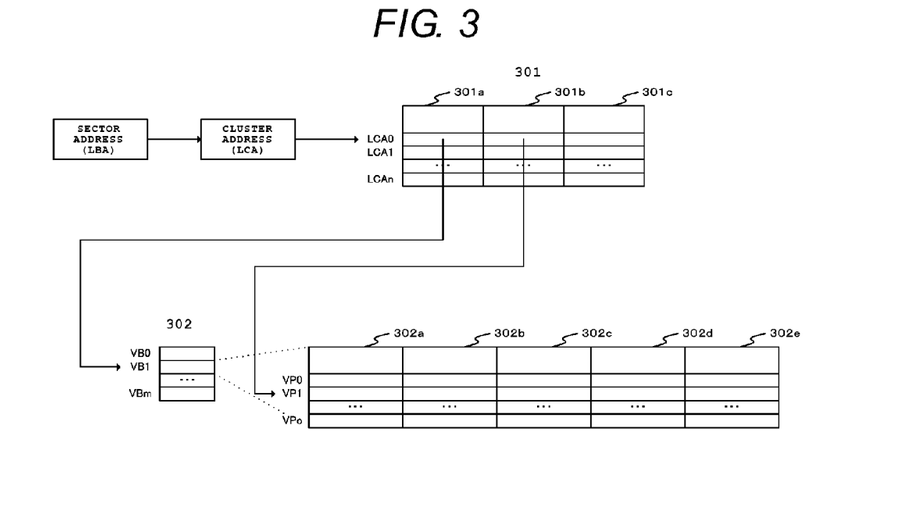
FIG. 3 is a diagram showing a table for solving a nonvolatile memory address from a sector address which is used in the memory system according to the first embodiment.

FIG. 3 is a diagram showing a table for solving a nonvolatile memory address from a sector address by the AddrResolve 26. First, an LCA is calculated based on an LBA which is notified from the host 2. An LCA table 301 holds information on a virtual block ID 301a indicating in which virtual block an LCA is, a virtual page ID 301b indicating on which virtual page of a virtual block indicated by the virtual block ID 301a the LCA is stored, and a cluster offset 301c indicating an order of a cluster in the virtual page which is indicated by the virtual page ID 301b.

Next, the virtual block ID 301a, the virtual page ID 301b, and an L2P table 302 are used to obtain in which nonvolatile memory the virtual page is included. The L2P table 302 is a table which stores information regarding in which address of which nonvolatile memory the virtual page ID 301b included in the virtual block ID 301a is included. Entries in the L2P table 302 are a first nonvolatile memory field 302a, a second nonvolatile memory field 302b, a cache field 302c of the second nonvolatile memory, an address field 302d of the first nonvolatile memory, and an address field 302e of the second nonvolatile memory. The first nonvolatile memory field 302a indicates that the virtual page is written in the first nonvolatile memory, and it is possible to specify an address in the first nonvolatile memory by reading the address field 302d of the first nonvolatile memory. The second nonvolatile memory field 302b indicates that the virtual page is written in the second nonvolatile memory, and it is possible to specify an address in the second nonvolatile memory by reading the address field 302e of the second nonvolatile memory. The cache field 302c of the second nonvolatile memory indicates that the virtual page is present both in the first nonvolatile memory and in the second nonvolatile memory and that the data in the first nonvolatile memory functions as a cache of the data in the second nonvolatile data. As described above, the AddrResolve 26 can solve which nonvolatile memory should be accessed by obtaining the virtual block ID 301a and the virtual page ID 301b from the LCA table 301 and retrieving the L2P table 302.

Figure 4:
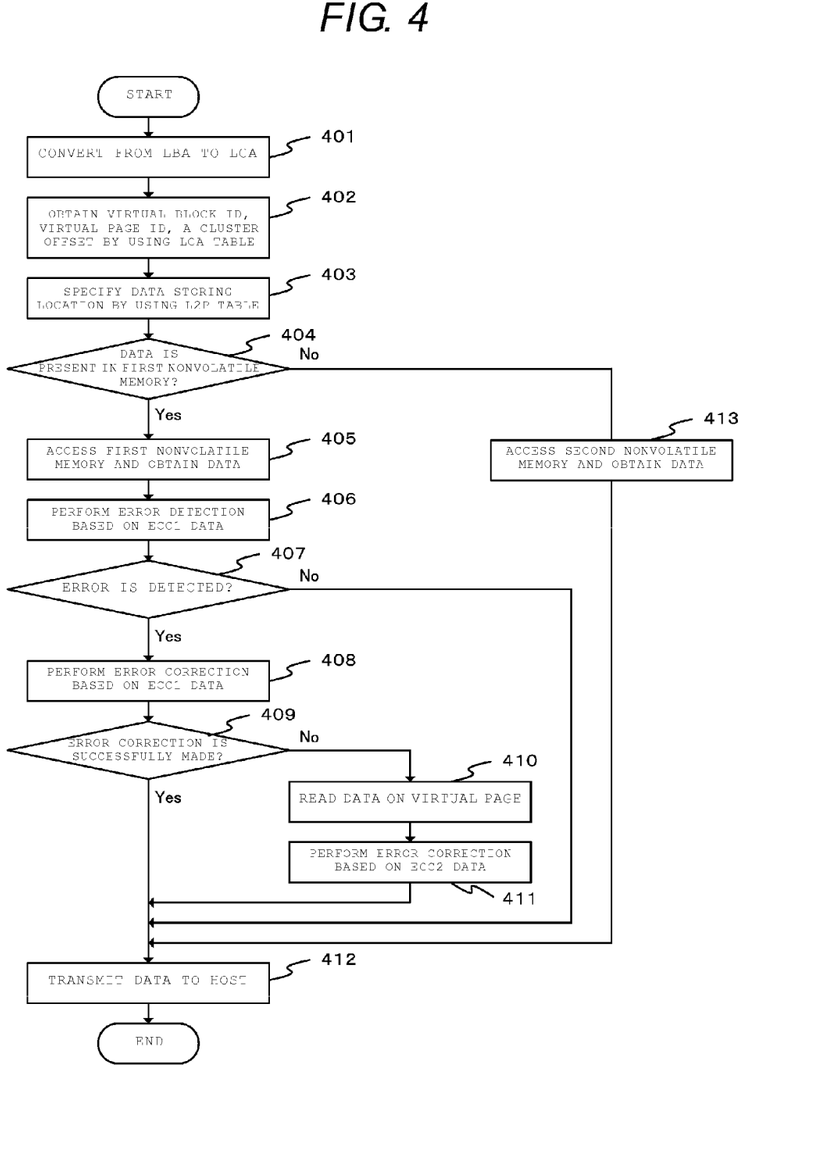
FIG. 4 is a flowchart of processing for reading data which is stored on a nonvolatile memory in the memory system according to the first embodiment.

FIG. 4 is a flowchart of a processing for reading data which is stored on the nonvolatile memory in the memory system according to the first embodiment. This flowchart shows processing for receiving a data reading request from the host 2, reading the requested data, and transmitting the data to the host 2.

If the memory controller 10 receives the data reading request from the host 2, the memory controller 10 converts the LBA which is received from the host 2 into the LCA (Step 401) and causes the AddrResolve 26 to obtain a virtual block ID, a virtual page ID, and a cluster offset based on the LCA (Step 402). Thereafter, the memory controller 10 specifies a place where in the nonvolatile memory the data is stored by using the L2P table 302 (Step 403) and determines whether or not the virtual page corresponding to the LCA is present in the first nonvolatile memory 50 (Step 404).

If the virtual page corresponding to the LCA is not present in the first nonvolatile memory 50 (Step 404: No), the memory controller 10 accesses the second nonvolatile memory 60 and obtains the data (Step 413) and then transmits the data to the host 2 (Step 412).

If the virtual page corresponding to the LCA is present only in the first nonvolatile memory 50 or is present in the first nonvolatile memory 50 as a copy from the second nonvolatile memory 60 (Step 404: Yes), the memory controller 10 reads the sector data and the ECC1 data from the first nonvolatile memory 50 (Step 405), performs error detection by using the ECC1 data (Step 406), and determines whether or not an error is detected (Step 407).

If an error is not detected (Step 407: No), the memory controller 10 transmits the read data to the host 2 (Step 412).

If an error is detected (Step 407: Yes), the memory controller 10 performs error correction by using the ECC1 data (Step 408).

If the error correction is successfully made based on the ECC1 data (Step 409: Yes), the memory controller 10 transmits the sector data after the correction to the host 2 (Step 412).

If the error correction is not successfully carried out based on the ECC1 data (Step 409: No), the memory controller 10 reads the data on the virtual page from either one of or both the first nonvolatile memory 50 and the second nonvolatile memory 60 (Step 410), performs error correction by using the ECC2 data which is read from the second nonvolatile memory 60 (Step 411), and transmits the sector data after the correction to the host 2 (Step 412).

According to the first embodiment, the sector data and the ECC1 data are stored on the first nonvolatile memory 50, and the ECC2 data with a higher error correction ability than the ECC1 data is stored on the second nonvolatile memory 60 instead of the first nonvolatile memory 50 in the memory system 1 as described above. The ECC1 data is added to each sector of the cluster in the first nonvolatile memory 50, and the error correction processing is performed by using the ECC1 data. If the error correction is successfully carried out based on the ECC1 data, it is possible to extract the sector data at a higher speed since it is not necessary to access the second nonvolatile memory 60. If the error correction is not successfully carried out based on the ECC1 data, the error correction is performed by the second nonvolatile memory 60 and the ECC2 data which is stored on the second nonvolatile memory 60.

There is a higher possibility that the sector data in the first nonvolatile memory 50 can be corrected by using the ECC2 data with a higher correction ability than that of the ECC1 data than a case where only the ECC1 data which is stored on the first nonvolatile memory 50 is used even if the data which is stored on the first nonvolatile memory 50 includes data errors which cannot be corrected by the correction ability of the ECC1 data.

Second Embodiment

Figure 5:
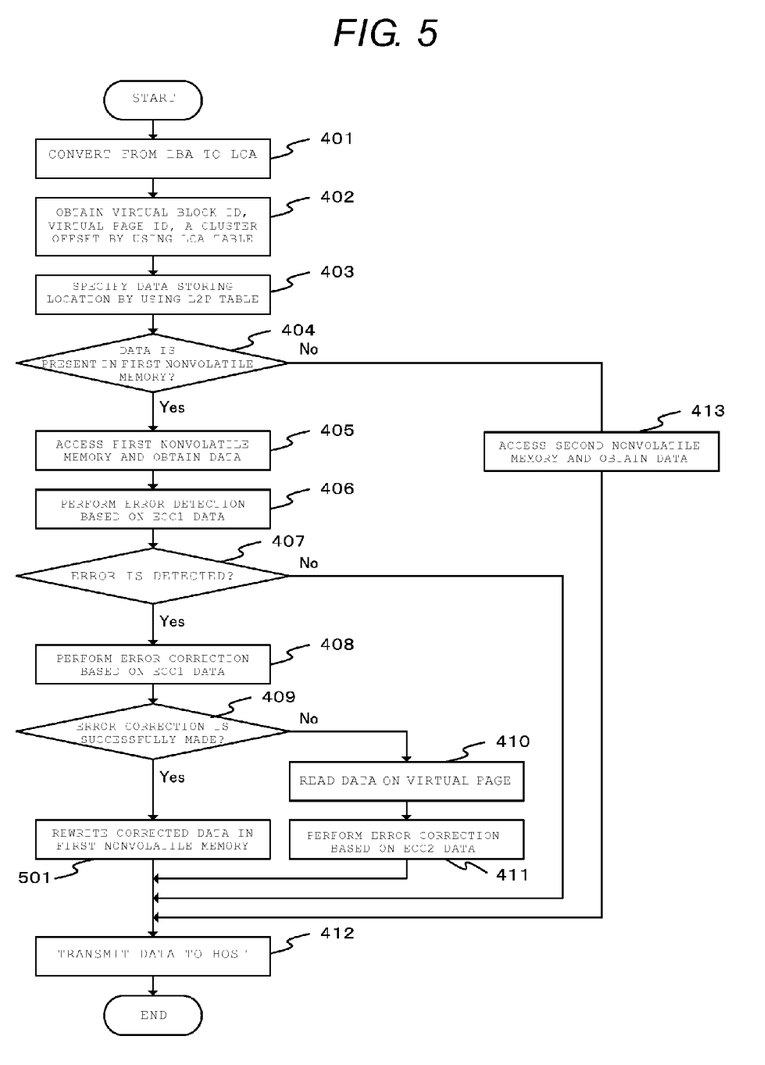
FIG. 5 is a flowchart of processing for reading data which is stored on a nonvolatile memory in a memory system according to a second embodiment.

FIG. 5 is a flowchart of a processing for reading data which is stored on a nonvolatile memory in a memory system according to a second embodiment. In FIG. 5, same reference numerals will be given to the same components as those in the configuration of FIG. 4. In addition, the configuration of the memory system according to the second embodiment is the same as that of the memory system 1 according to the first embodiment shown in FIG. 1.

The second embodiment is different from the first embodiment in that the memory controller 10 executes processing for rewriting the data after the correction in the first nonvolatile memory 50 (Step 501) if the error correction is successfully carried out based on the ECC1 data in Step 409 (Step 409: Yes). The processing corresponds to a refreshing operation for a corresponding region in the first nonvolatile memory 50. There is a lower possibility that errors are included in the read data when the same sector is read thereafter, and it is possible to reduce the possibility of performing the error correction based on the ECC1 data or the ECC2 data.

According to the second embodiment, it is possible to perform the error correction processing by reading the cluster of the first nonvolatile memory 50 and using the ECC1 data which is added to each sector of the cluster that is present in the first nonvolatile memory 50 in the memory system 1 in the same manner as in the first embodiment. When the error correction is performed, it is possible to reduce the possibility of performing error correction when the same sector is read thereafter by rewriting the data after the correction in the sector from which an error is detected.

Third Embodiment

Figure 6:
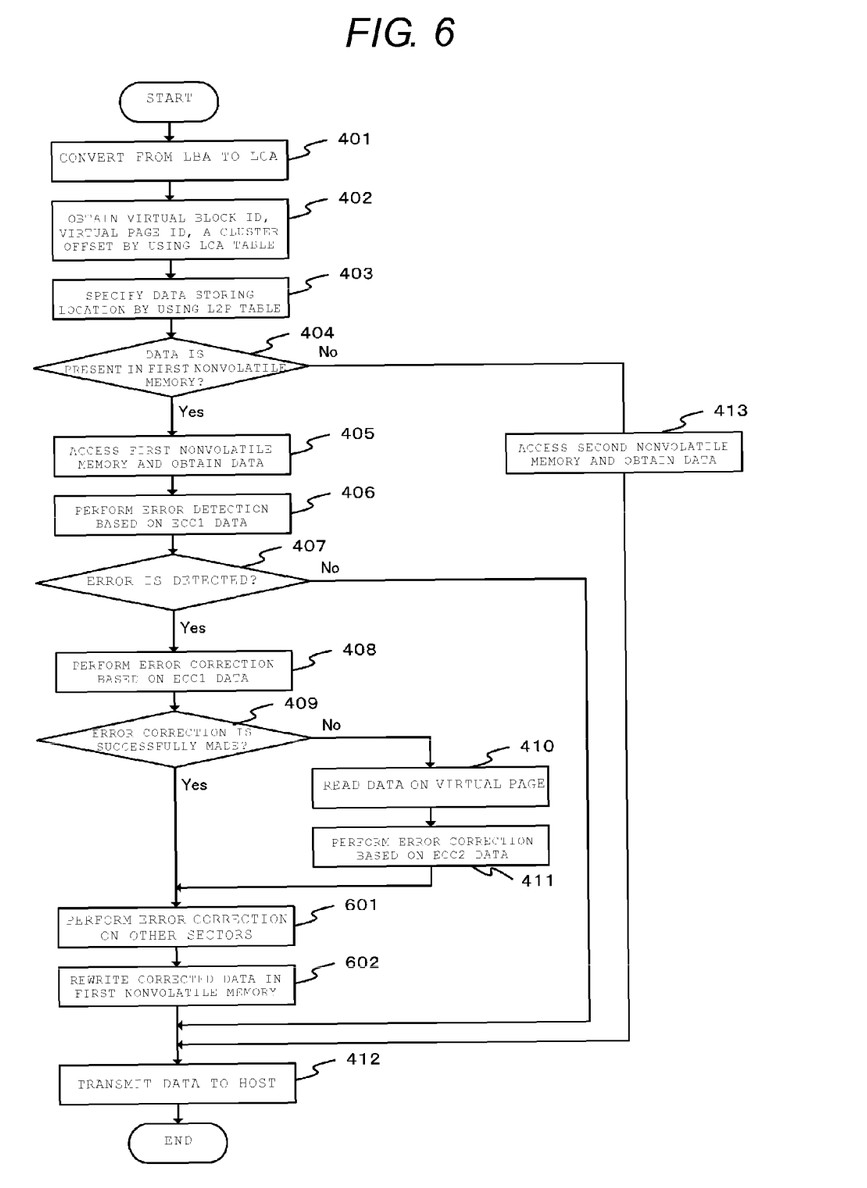
FIG. 6 is a flowchart of processing for reading data which is stored in a nonvolatile memory in a memory system according to a third embodiment.

FIG. 6 is a flowchart of processing for reading data which is stored on the nonvolatile memory in a memory system according to a third embodiment. In FIG. 6, same reference numerals are given to the same components as those in the configuration of FIG. 4. In addition, the configuration of the memory system according to the third embodiment is the same as that of the memory system 1 according to the first embodiment shown in FIG. 1.

The third embodiment is different from the first embodiment in that the memory controller 10 performs the error correction processing for all the sectors in the same virtual page as that of a sector from which an error is detected (Step 601) and executes processing for rewriting the sector data which is corrected in the second nonvolatile memory 60 (Step 602) when the error is detected based on the ECC1 data in Step 407 (Step 407: Yes). Since the data in the same virtual page as that of the sector from which the error is detected is retained for the same period as that of the sector from which the error is detected, there is a high possibility that an error occurred in the same manner as in the sector from which the error is detected, and there is a possibility of reducing the correction processing which may occur thereafter by collectively performing refreshing. If an error is detected in a certain sector data, a range on which the error correction processing is further performed may be arbitrarily determined and may be all or a part of the sectors in the virtual page.

According to the third embodiment, it is possible to reduce the correction processing which may occur thereafter by performing the error correction processing on data of sectors other than the sector from which an error is detected and rewriting the data after the correction in the sector from which the error is detected when the error is detected from the data, the reading request of which is received from the host 2 in the memory system 1.

Fourth Embodiment

Figure 7:
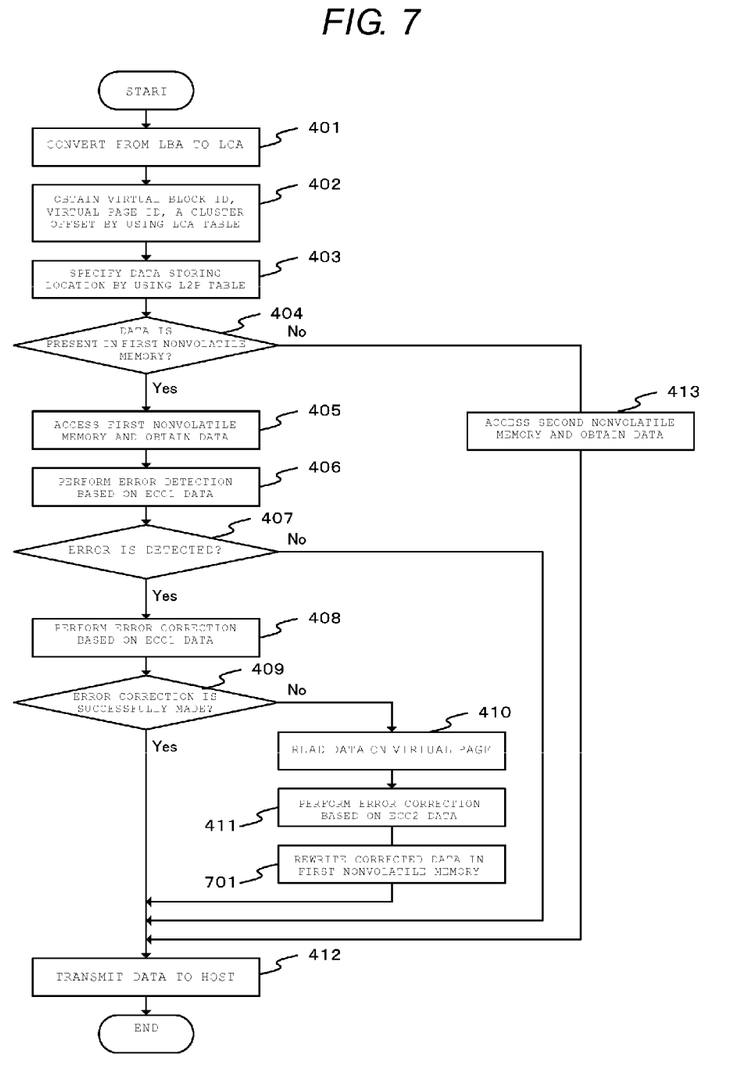
FIG. 7 is a flowchart of processing for reading data which is stored in a nonvolatile memory in a memory system according to a fourth embodiment.

FIG. 7 is a flowchart of processing for reading data which is stored in a nonvolatile memory in a memory system according to a fourth embodiment. In FIG. 7, same reference numerals are given to the same components as those in the configuration of FIG. 4. In addition, the configuration of the memory system according to the fourth embodiment is the same as that of the memory system 1 according to the first embodiment which is shown in FIG. 1.

The fourth embodiment is different from the first embodiment in that the memory controller 10 executes the processing for rewriting the data after the correction in the first nonvolatile memory 50 (Step 701) if the error correction is performed based on the ECC2 data (Step 411). The processing corresponds to a refreshing operation for a corresponding region in the first nonvolatile memory 50. There is less possibility that an error is included in the read data when the same sector is read thereafter, and it is possible to reduce the possibility of performing the error correction on the data based on the ECC1 data or the ECC2 data.

According to the fourth embodiment, it is possible to perform the error correction processing by using the ECC1 data which is stored on the first nonvolatile memory 50 and the ECC2 data which is stored on the second nonvolatile memory 60 in the memory system 1 in the same manner as in the first embodiment. In addition, when the error correction is performed based on the ECC2 data, it is possible to reduce the possibility of performing the error correction when the same sector is read thereafter by rewriting the data after the correction in the sector from which the error is detected.

Fifth Embodiment

Figure 8:
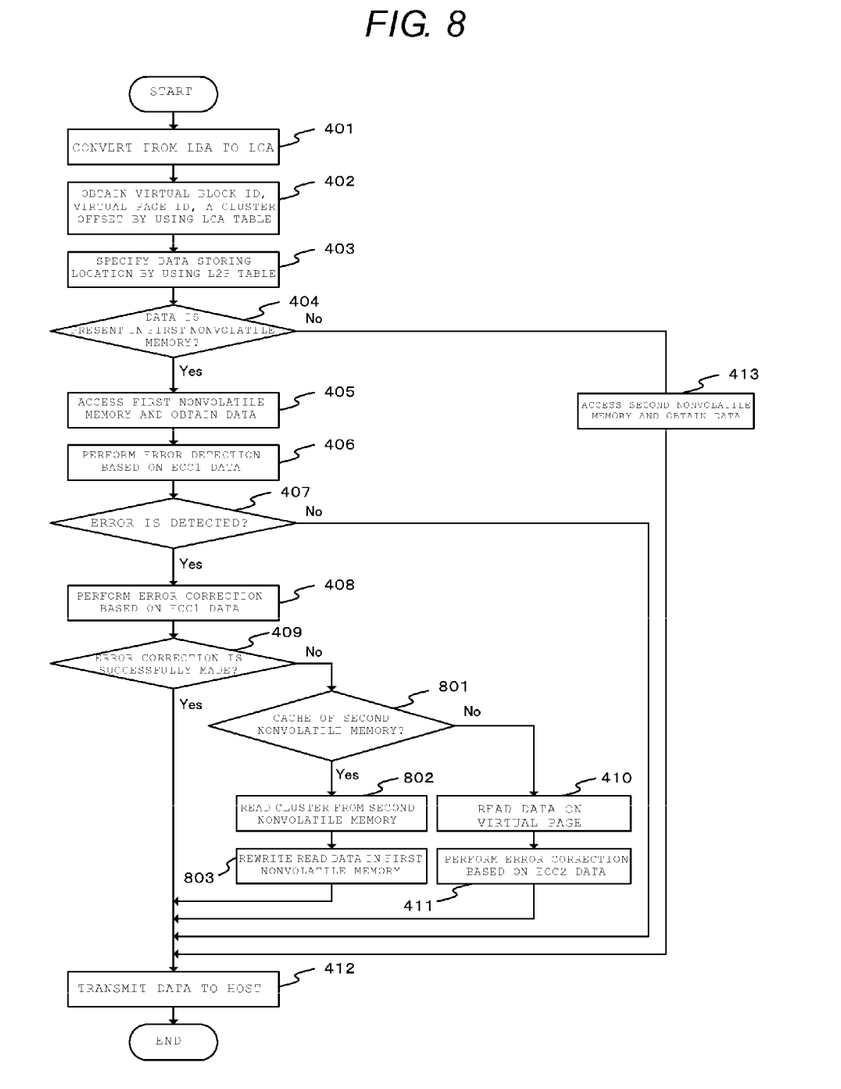
FIG. 8 is a flowchart of processing for reading data which is stored in a nonvolatile memory in a memory system according to a fifth embodiment.

FIG. 8 is a flowchart of processing for reading data which is stored in a nonvolatile memory in a memory system according to a fifth embodiment. In FIG. 8, same reference numerals are given to the same components as those in the configuration of FIG. 4. In addition, the configuration of the memory system according to the fifth embodiment is the same as that of the memory system 1 according to the first embodiment which is shown in FIG. 1.

The fifth embodiment is different from the first embodiment in that the memory controller 10 executes processing for determining whether or not the data which is stored on the first nonvolatile memory 50 is a cache of the data which is stored in the second nonvolatile memory 60 (Step 801), processing for reading a cluster from the second nonvolatile memory 60 (Step 802), and processing for rewriting sector data in the cluster in the first nonvolatile memory 50 (Step 803) if error correction is not successfully carried out based on the ECC1 data in Step 409 (Step 409: No). It is possible to determine whether or not the data which is stored on the first nonvolatile memory 50 is a cache of the data which is stored on the nonvolatile memory 60 based on a result of the address solution which is shown in FIG. 3.

If the memory controller 10 receives a data reading request from the host 2, the memory controller 10 converts the LBA which is received from the host 2 into an LCA (Step 401) and obtains a virtual block ID, a virtual page ID, and a cluster offset by using the AddrResolve 26 based on the LCA (Step 402) as shown in FIG. 8. If a virtual page corresponding to a cluster is present only in the second nonvolatile memory or is present in the first nonvolatile memory 50 as a copy from the second nonvolatile memory 60 (Step 404: Yes) as a result of the address solution which is shown in FIG. 3, the memory controller 10 reads the sector data and the ECC1 data from the first nonvolatile memory 50 (Step 405).

If the error correction is not successfully performed based on the ECC1 data (Step 409: No) and the virtual page corresponding to the cluster is present in the first nonvolatile memory 50 as a copy from the second nonvolatile memory 60 (Step 801: Yes), the memory controller 10 reads the virtual page from the second nonvolatile memory 60, extracts the cluster from the virtual page (Step 802), and writes data on a corresponding sector in a corresponding address of the first nonvolatile memory 50 from among the sectors which configure the cluster (Step 803). In doing so, it is not necessary to perform correction based on the ECC2 data and reduce an overhead for the error correction based on the ECC2 data.

If the data in the first nonvolatile memory 50 is not a copy from the second nonvolatile memory 60 (Step 801: No), the memory controller 10 reads the data on the virtual page from the first nonvolatile memory 50 (Step 410), performs the error correction based on the ECC2 data (Step 411), and transmits the sector data after the correction to the host 2 (Step 412).

According to the fifth embodiment, it is possible to perform the error correction by reading the cluster of the first nonvolatile memory 50 and using the ECC1 data which is added to each sector of the cluster in the first nonvolatile memory 50 in the memory system 1 in the same manner as in the first embodiment. In addition, if the virtual page corresponding to the cluster is present in the first nonvolatile memory 50 as a copy from the second nonvolatile memory 60, it is not necessary to perform the error correction based on the ECC2 data and it is possible to reduce an overhead for the error correction based on the ECC2 data even if it is not possible to correct the error based on the ECC1 data. In addition, it is possible to reduce the possibility of performing the error correction when the same sector is read thereafter by rewriting the data after the correction in the sector from which the error is detected.

In addition, exemplary embodiments are not limited to the aforementioned embodiments, and it is a matter of course that various modifications can be added without departing from the gist of the exemplary embodiments.

Although the above embodiments are described, the embodiments are shown only for an illustrative purpose and are not intended to limit the scope of the exemplary embodiments. The embodiments can be implemented in various manners, and various omissions, replacements, and modifications can be made without departing from the gist of the exemplary embodiments. The embodiments and the modifications thereof are included in the scope and the gist of the exemplary embodiments and are included in the inventions described in the claims and an equivalent scope.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
 a first nonvolatile memory for storing first data and a first error correction code generated for the first data;
 a second nonvolatile memory which has a longer access latency than that of the first nonvolatile memory, for storing a second error correction code generated for the first data with a higher correction ability than that of the first error correction code;
 a first error correction unit configured to execute error correction processing on the first data by using the first error correction code stored in the first nonvolatile memory;
 a second error correction unit configured to execute error correction processing on the first data by using the second error correction code stored in the second nonvolatile memory; and
 an interface configured to transmit the first data after the error correction to a host.

2. The memory system according to claim 1, wherein the second nonvolatile memory has higher reliability than the first nonvolatile memory.

3. The memory system according to claim 1, further comprising:

a determination unit configured to determine whether or not the first error correction unit is unable to perform error correction on the first data, wherein when the determination unit determines that the first error correction unit is unable to perform the error correction on the data, the second error correction unit executes error correction processing on the first data.

4. The memory system according to claim 3, wherein when the determination unit determines that the first error correction unit is able to perform the error correction on the first data, the interface transmits the first data after the error correction processing by the first error correction unit to the host.

5. The memory system according to claim 4, wherein the first data after the error correction processing by the first error correction unit is written in the first nonvolatile memory.

6. The memory system according to claim 3, wherein when the second error correction unit executes the error correction processing on the first data, the interface transmits the first data after the error correction processing by the second error correction unit to the host.

7. The memory system according to claim 6, wherein the first data after the error correction processing by the second error correction unit is written in the first nonvolatile memory.

8. The memory system according to claim 1, wherein when first data designated by a logical address received from the host is stored in both the first nonvolatile memory and on the second nonvolatile memory, and the determination unit determines that it is unable to perform the error correction on the first data stored on the first nonvolatile memory, the first data stored in the second nonvolatile memory is transmitted to the host.

9. The memory system according to claim 8, wherein when first data designated by a logical address received from the host is stored in both the first nonvolatile memory and on the second nonvolatile memory, and the determination unit determines that it is unable to perform the error correction on the first data stored on the first nonvolatile memory, the first data stored in the second nonvolatile memory is written in the first nonvolatile memory.

10. The memory system according to claim 1, wherein the first error correction code is generated in units of first data.

11. The memory system according to claim 10, wherein the second error correction code is generated in units of a plurality of second data items that include the first data and the first error correction code.

12. A memory system comprising:
a first nonvolatile memory for storing first data and a first error correction code generated from the first data;
a second nonvolatile memory for storing a second error correction code generated from the first data and the first error correction code;
a first error correction unit configured to execute error correction processing on the first data by using the first error correction code stored in the first nonvolatile memory;
a second error correction unit configured to execute error correction processing on the first data by using the second error correction code stored in the second nonvolatile memory; and
an interface configured to transmit the first data after the error correction to a host.

13. The memory system according to claim 12, further comprising:
a determination unit configured to determine whether or not the first error correction unit is unable to perform error correction on the first data,
wherein when the determination unit determines that the first error correction unit is unable to perform the error correction on the data, the second error correction unit executes error correction processing on the first data.

14. The memory system according to claim 13, wherein when the determination unit determines that the first error correction unit is able to perform the error correction on the first data, the interface transmits the first data after the error correction processing by the first error correction unit to the host.

15. The memory system according to claim 14, wherein the first data after the error correction processing by the first error correction unit is written in the first nonvolatile memory.

16. The memory system according to claim 13, wherein when the second error correction unit executes the error correction processing on the first data, the interface transmits the first data after the error correction processing by the second error correction unit to the host.

17. The memory system according to claim 16, wherein the first data after the error correction processing by the second error correction unit is written in the first nonvolatile memory.

18. The memory system according to claim 12, wherein when first data designated by a logical address received from the host is stored in both the first nonvolatile memory and on the second nonvolatile memory, and the determination unit determines that it is unable to perform the error correction on the first data stored on the first nonvolatile memory, the first data stored in the second nonvolatile memory is transmitted to the host.

19. The memory system according to claim 18, wherein when first data designated by a logical address received from the host is stored in both the first nonvolatile memory and on the second nonvolatile memory, and the determination unit determines that it is unable to perform the error correction on the first data stored on the first nonvolatile memory, the first data stored in the second nonvolatile memory is written in the first nonvolatile memory.

20. A method of error correction processing in a memory system having a first nonvolatile memory for storing first data and a first error correction code generated from the first data, and a second nonvolatile memory for storing a second error correction code generated from the first data and the first error correction code, said method comprising:
receiving a request for the first data;
reading the first data from the first nonvolatile memory and detecting an error in the first data;
performing error correction processing on the first data using the first error correction code stored in the first nonvolatile memory;
determining whether or not the error correction processing is successful;
if the error correction processing is successful, transmitting the first data after the error correction to a requestor of the first data; and
if the error correction processing is not successful, performing another error correction processing on the first data using the second error correction code stored in the second nonvolatile memory.

\* \* \* \* \*